(12) United States Patent
Vo et al.

(10) Patent No.: US 9,778,051 B2
(45) Date of Patent: Oct. 3, 2017

(54) DIVERSIFIED ROUTE PLANNING FOR PUBLIC TRANSPORTATION NETWORK

(71) Applicant: SAP SE, Walldorf (DE)

(72) Inventors: Hoang Tam Vo, Singapore (SG); Peng Ni, Singapore (SG); Chengbin Yan, Singapore (SG)

(73) Assignee: SAP SE, Walldorf (DE)

( * ) Notice: Subject to any disclaimer, the term of this patent is extended or adjusted under 35 U.S.C. 154(b) by 87 days.

(21) Appl. No.: 14/840,069

(22) Filed: Aug. 31, 2015

(65) Prior Publication Data

US 2017/0059341 A1    Mar. 2, 2017

(51) Int. Cl.
G01C 21/34    (2006.01)
G01C 21/36    (2006.01)
G06Q 10/04    (2012.01)

(52) U.S. Cl.
CPC ..... *G01C 21/3423* (2013.01); *G01C 21/3446* (2013.01); *G01C 21/3453* (2013.01); *G01C 21/3676* (2013.01); *G06Q 10/047* (2013.01)

(58) Field of Classification Search
CPC ............ G01C 21/3453; G01C 21/3446; G01C 21/3423; G06Q 10/047; G06F 17/509; G06F 17/30958
See application file for complete search history.

(56) References Cited

U.S. PATENT DOCUMENTS 8,972,185 B1 * 3/2015 Viger ................. G01C 21/3423
701/533

2011/0112759 A1 * 5/2011 Bast ................... G01C 21/3423
701/533

OTHER PUBLICATIONS

Xu, Wangtu, et al. "Finding the K shortest paths in a schedule-based transit network." Computers & Operations Research 39.8 (2012): 1812-1826.*
Hannah Bast et al., Route Planning in Transportation Networks, Technical Report MSR-TR-2014-4, Jan. 8, 2014, pp. 1-56, Microsoft Research Microsoft Corporation, Redmond, WA.
Justin Boyan and Michael Mitzenmacher, Improved Results for Route Planning in Stochastic Transportation Networks, ACM-SIAM Symposium on Discrete Algorithms (SODA), 2001, pp. 895-902, Cambridge, MA.
Russel E. Caflisch, Monte Carlo and Quasi-Monte Carlo Methods, Acta Numerica, 1998, pp. 1-49, 7, Cambridge University Press, Los Angeles, CA.

(Continued)

*Primary Examiner* — Dale Moyer
(74) *Attorney, Agent, or Firm* — Jones Day

(57) ABSTRACT

A route planner for a transportation network is disclosed. The route planner generates k suggested routes based on a user query using a diversified k shortest routes technique. The diversified k shortest routes techniques analyzes a transportation graph and suggests k routes to the user. The diversified k shortest routes can provide a user with options to take the next best route if they miss the optimal one. These options also include other preferences, such as less number of transfers, as long as they are reasonable in terms of total travel time. The suggested routes take into account travel calendars, as well as location-to-location queries which require geocoding and reverse geocoding capabilities. Transfers between different types of transportation services such as train and bus are also supported.

19 Claims, 11 Drawing Sheets

(56) References Cited

OTHER PUBLICATIONS

Bi Yu Chen et al., Finding Reliable Shortest Paths in Road Networks Under Uncertainty, Networks and Spatial Economics, Jun. 2013, pp. 123-148, 13-2, Springer US, U.S.A.

Mayur Datar and Abhiram Ranade, Commuting with Delay Prone Buses, ACM-SIAM Symposium on Discrete Algorithms (SODA), Feb. 1, 2000, pp. 22-29, Society for Industrial and Applied Mathematics, Philadelphia, PA.

Yann Disser et al., Multi-Criteria Shortest Paths in Time-Dependent Train Networks, Experimental Algorithms, 2008, pp. 347-361, Springer-Verlag Berlin/Heidelberg, Berlin, Heidelberg.

Daniel Dufresne, Sums of Lognormals, Actuarial Research Conference, 2008, pp. 1-6, Centre for Actuarial Studies, University of Melbourne, Melbourne.

Song Gao, Optimal Adaptive Routing and Traffic Assignment in Stochastic Time-Dependent Networks, PhD Thesis, 2005, pp. 1-237, Massachusetts Institute of Technology, Massachusetts.

Song Gao and Ismail Chabini, Optimal Routing Policy Problems in Stochastic Time-Dependent Networks, Transportation Research Part B: Methodological, Feb. 2006, pp. 93-122, 40-42, Elsevier Ltd.

Song Gao et al., Adaptive Route Choices in Risky Traffic Networks: A Prospect Theory Approach, Transportation Research Part C: Emerging Technologies, Oct. 2010, pp. 727-740, 18-5, Elsevier Ltd.

Randolph W. Hall, The Fastest Path Through a Network with Random Time-Dependent Travel Times, Transportation Science, Aug. 1986, pp. 182-188, 20-23, INFORMS, Hanover, MD.

Jordan Ivanchev et al., Stochastic Bus Traffic Modelling and Validation Using Smart Card Fare Collection Data, Intelligent Transportation Systems (ITSC), Oct. 8-11, 2014, pp. 2054-2061, 2014 IEEE 17th International Conference on Intelligent Transportation Systems (ITSC), Qingdao.

Der-Horng Lee et al., Study of Bus Service Reliability in Singapore Using Fare Card Data, 12th Asia-Pacific Intelligent Transportation Forum, Jan. 2012, pp. 1-10, Research Gate, Singapore.

Sejoon Lim et al., Stochastic Motion Planning and Applications to Traffic, Algorithmic Foundation of Robotics VIII, 2009, pp. 483-500, 57, Springer Berlin/Heidelberg, Berlin, Heidelberg.

Sejoon Lim et al., Practical Route Planning Under Delay Uncertainty: Stochastic Shortest Path Queries, Robotics: Science and Systems, Jul. 5, 2013, pp. 249, 8-32, The MIT Press, Cambridge, MA.

Ronald Prescott Loui, Optimal Paths in Graphs with Stochastic or Multidimensional Weights, Communications of the ACM, Sep. 1983, pp. 670-676, 26-29, ACM, New York, U.S.A.

Gopinath Menon et al., Lessons from Bus Operations, A Report Collected from web http://www.ptc.gov.sg/_files/LessonsfromBusOperationsREV5.pdf, Mar. 2006, pp. 1-25, Singapore.

Elise D. Miller-Hooks and Hani S. Mahmassani, Least Expected Time Paths in Stochastic, Time-Varying Transportation Networks, Transportation Science, May 1, 2000, pp. 198-215, 34-2, INFORMS, Catonsville, MD.

Evdokia Nikolova, Approximation Algorithms for Reliable Stochastic Combinatorial Optimization, Approximation, Randomization, and Combinatorial Optimization. Algorithms and Techniques, Sep. 17, 2010. pp. 338-351, Massachusetts Institute of Technology, Massachusetts.

Evdokia Nikolova et al., Optimal Route Planning under Uncertainty, International Conference on Automated Planning and Scheduling (ICAPS), Jun. 2006, pp. 131-141, 6, Mitsubishi Electric Research Laboratories, Inc., Cambridge, MA.

Evdokia Nikolova et al., Stochastic Shortest Paths via Quasi-Convex Maximization, European Symposium on Algorithms (ESA) Proceedings of the 14th Conference on Annual European Symposium, 2006, pp. 552-563, 14, Springer-Verlag London, United Kingdom.

E. E. Osuna and G. F. Newell, Control Strategies for an Idealized Public Transportation System, Transportation Science, Feb. 1, 1972, pp. 52-72, 6-1, Informs, Catonsville, MD.

Jin Park et al., Use of Smart Card Data to Define Public Transit Use in Seoul, South Korea, Transportation Research Record: Journal of the Transportation Research Board, 2008, pp. 3-9, 2063-1, Transportation Research Board of the National Academies, Washington D.C.

Evangelia Pyrga et al., Efficient Models for Timetable Information in Public Transportation Systems, Journal of Experimental Algorithms (JEA), 2008, pp. 2-4, 12, ACM, New York, U.S.A.

Shichao Sun et al., How to Find the Optimal Paths in Stochastic Time-Dependent Transportation Networks?, Intelligent Transportation Systems (ITSC), Oct. 8-11, 2014, pp. 2348-2353, 2014 IEEE 17th International Conference on Intelligent Transportation Systems (ITSC), Qingdao.

Chengjin Wu et al., Adaptive Route Guidance Based on Real-Time Information in Stochastic Time-Dependent Transportation Networks, Intelligent Transportation Systems (ITSC), Oct. 8-11, 2014, pp. 2392-2397, 2014 IEEE 17th International Conference on Intelligent Transportation Systems (ITSC), Qingdao.

King Wu and Yu (Marco) Nie, Modeling Heterogeneous Risk-Taking Behavior in Route Choice: A Stochastic Dominance Approach, Transportation Research Part A: Policy and Practice, Nov. 2011, pp. 896-915, 45-49, Elsevier Ltd.

Verband Deutscher Verkehrsunternehmen (VDV), VDV Schriften, VDV Standard Interface Network/Timetable, http://mitglieder.vdv.de/module/layout_upload/452_sesv14.pdf, Accessed on Dec. 5, 2015, Association of German Transport.

E. W. Dijkstra, A Note on Two Problems in Connexion with Graphs, Numerische Mathematik 1, 1959, pp. 269-271, Springer-Verlag.

Vedat Akgun et al., On Finding Dissimilar Paths, European Journal of Operational Research, 2000, pp. 232-246, Elsevier Science B.V.

Hannah Bast et al., Fast Routing in Very Large Public Transportation Networks using Transfer Patterns, Annual European Conference on Algorithms, 2010, pp. 290-301, Springer-Verlag Berlin.

Hannah Bast et al., Route Planning in Transportation Networks, Technical Report, MSR-TR-2014-4, 2014.

Reinhard Bauer et al., SHARC: Fast and Robust Unidirectional Routing, Journal of Experimental Algorithmics, Jan. 2010, ACM, USA.

Reinhard Bauer et al., Experimental Study on Speed-Up Techniques for Timetable Information Systems, 7th Workshop on Algorithmic Approaches for Transportation Modeling, Optimization, and Systems, 2007, pp. 209-225, ATMOS.

Wojciech Chmiel et al., A Multicriteria Model for Dynamic Route Planning, Multimedia Communications, Services and Security, 2011, vol. 149, Poland.

Joao C.N. Climaco et al., Finding Non-Dominated Bicriteria Shortest Pairs of Disjoint Simple Paths, Computers & Operations Research, 2009, vol. 36, Issue 11, Elsevier Ltd., UK.

Daniel Delling et al., Computing Multimodal Journeys in Practice, Experimental Algorithms, 2013, pp. 260-271, vol. 7933, Springer Berlin Heidelberg.

Paolo Dell'Olmo et al., On Finding Dissimilar Pareto-Optimal Paths, European Journal of Operational Research, Apr. 2005, pp. 70-82, vol. 162, Issue 1, Elsevier B.V.

Yann Disser et al., Multi-criteria Shortest Paths in Time-Dependent Train Networks, Experimental Algorithms, 2008, pp. 347-361, vol. 5038, Springer Berlin Heidelberg.

David Eppstein, Finding the k Shortest Paths, Mar. 31, SIAM Journal on Computing, Apr. 1999, vol. 28, Issue 2, USA.

Wen Jin et al., Finding the K Shortest Paths in a Time-Schedule Network with Constraints on Arcs, Computers & Operations Research, Dec. 2013, pp. 2975-2982, vol. 40, Issue 12, Elsevier Ltd.

Rafael Marti et al., Heuristics for the Bi-Objective Path Dissimilarity Problem, Computers & Operations Research, vol. 36, Issue 11, Jan. 2009, Elsevier Ltd.

Matthias Mueller-Hannemann et al., Finding All Attractive Train Connections by Multi-criteria Pareto Search, Algorithmic Methods for Railway Optimization, 2007, pp. 246-263, vol. 4359, Springer-Verlag Berlin Heidelberg.

Evangelia Pyrga et al., Efficient Models for Timetable Information in Public Transportation Systems, Journal of Experimental Algorithmics (JEA), Jun. 2008, vol. 12, Article No. 2.4, ACM.

(56) References Cited

OTHER PUBLICATIONS

Wangtu Xu et al., Finding the K Shortest Paths in a Schedule-Based Transit Network, Computers & Operations Research, Aug. 2012, pp. 1812-1826, vol. 39, Issue 8, Elsevier Ltd.
Jin Y. Yen et al., Finding the K Shortest Loopless Paths in a Network, Management Science, Theory Series, Jul. 1971, pp. 712-716, vol. 17, No. 11, INFORMS.

* cited by examiner

Bus Line A Schedule

| Stops | Mon-Fri | Sat-Sun |
|---|---|---|
| Stop 1 | 9:05 | 9:10 |
| Stop 2 | 9:20 | 9:25 |

312

Bus Line B Schedule

| Stops | Mon-Fri | Sat-Sun |
|---|---|---|
| Stop 1 | 9:08 | 9:13 |
| Stop 2 | 9:23 | 9:28 |

314

Stop Information

| ID | Mon-Fri | Geolocation |
|---|---|---|
| 1 | Stop 1 | [longitude, latitude] |
| 2 | Stop 2 | [longitude, latitude] |

Stop Information

| ID | Mon-Fri | Geolocation |
|---|---|---|
| 1 | Stop 1 | [longitude, latitude] |
| 2 | Stop 2 | [longitude, latitude] |

324

Edge Information

| Type | From | To | Travel Time |
|---|---|---|---|
| Route | r@1@LA | r@2@LA | Mon-Fri-> [9:05, 15]; Sat-Sun-> [9:10, 15] |
| Route | r@1@LB | r@2@LB | Mon-Fri-> [9:08, 15]; Sat-Sun-> [9:13, 15] |
| Transfer | t@1 | r@1@LA | 0 |
| Alight | r@1@LA | t@1 | 0 |
| Transfer | t@1 | r@1@LB | 0 |
| Alight | r@1@LB | t@1 | 0 |
| Transfer | t@2 | r@2@LA | 0 |
| Alight | r@2@LA | t@2 | 0 |
| Transfer | t@2 | r@2@LB | 0 |
| Alight | r@2@LB | t@2 | 0 |

Data Structure of Transportation Graph

| r@1@LA | → | {r@2@LA, Mon-Fri -> [9:05, 15]; Sat-Sun -> [9:10, 15]}, {t@1, 0} |
| --- | --- | --- |
| r@1@LB | → | {r@2@LB, Mon-Fri -> [9:08, 15]; Sat-Sun -> [9:13, 15]}, {t@1, 0} |
| t@1 | → | {r@1@LA, 0}, {r@1@LB, 0} |
| t@2 | → | {r@2@LA, 0}, {r@2@LB, 0} |
| r@2@LA | → | {t@2, 0} |
| r@2@LB | → | {t@2, 0} |

332

Stop Information

| ID | Mon-Fri | Geolocation |
| --- | --- | --- |
| 1 | Stop 1 | [longitude, latitude] |
| 2 | Stop 2 | [longitude, latitude] |

DIVERSIFIED ROUTE PLANNING FOR PUBLIC TRANSPORTATION NETWORK

CROSS-REFERENCE TO RELATED APPLICATIONS

This application cross-references to U.S. patent application Ser. No. 14/840,064, titled "ROUTE PLANNER FOR TRANSPORTATION SYSTEMS" that is concurrently filed and assigned to the same assignee as this application, which is herein incorporated by reference for all purposes.

TECHNICAL FIELD

The present disclosure relates to computer systems, and more specifically, to a framework for generating diversified public transport route plans based on user preference.

BACKGROUND

A public transportation network forms an important part of a metropolitan area. Numerous people living in the metropolitan area rely on public transportation for various purposes. For example, regular users rely on public transportation for work or school commute while others rely on it for transportation from one location to another, such as meeting with friends, going to dinner or watching a movie.

Typically, the transportation network includes a number of services, such as different types of transports, for example, trains, buses, or trolleys. Furthermore, numerous services or lines make up the transportation network, particularly in a large or developed metropolitan area. Such an extensive network may offer a user of the network numerous options to reach his/her destination. This makes it complicated for the user to select an appropriate option based on time and the user's preferences. For example, the user may prefer a shorter travel time over less transfers. In some instances, the user may require additional options with different schedules due to inability time constraints.

The present disclosure is directed to a transportation route planner which takes into consideration various criteria and provides diversified k shortest paths.

SUMMARY

A framework for recommending public transportation routes of a transportation network to a user is described herein. In accordance with one aspect, the framework includes a computer-implemented method. The method includes providing a transportation graph comprising nodes corresponding to stations of the transportation network. The nodes are connected by edges. The edges include cost information and transport schedules. Input parameters from a user query on a user device are received. The input parameters include an origination node $n_s$, a destination node $n_d$ and a departure time $t_{dep}$. K routes are generated to suggest to the user based on the input parameters using k shortest paths. The k routes are displayed on a display of the user device of the user.

In another aspect, a route planning system for generating suggested routes of a transportation network is disclosed. The system includes a repository module. The repository module includes a graph engine unit. The graph engine unit includes a data structure representing a transportation graph. The transportation graph includes nodes corresponding to stations of the transportation network. The nodes are connected by edges. The edges include cost information and transport schedule. The system also includes a service module. The service module includes a routing service unit for generating routes to a user based on a user query, which includes $n_s$, $n_d$ and $t_{dep}$. The routing service unit generates the routes using k shortest paths. The system also includes an output module. The output module includes application program interface units which are included by applications on a user device.

In yet another aspect, a non-transitory computer-readable medium having stored thereon a program code is disclosed. The program code is executable by a computer for planning routes for a transportation network. An in-memory time dependent transportation graph comprising nodes corresponding to stations of the transportation network is provided. The nodes are connected by edges. The edges include cost information and transport schedule. Input parameters from a user query on a user device are received. The input parameters include an origination node $n_s$, a destination node $n_d$ and a departure time $t_{dep}$. K routes are generated to suggest to the user based on the input parameters using k shortest paths. The k routes are displayed on a display of the user device of the user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIGS. 3b-3d show various stages of generating a transportation graph;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework is provided for generating public transport route plans. In one embodiment, the framework generates diversified public transport route plans which improvise user satisfaction. For example, the route plans are based on user preferences. User preferences may include various preference criteria, such as travel time between starting and ending stations, time at the starting station, time at the ending station, number of transfers between the starting and ending stations, as well as preferential intermediate stations. Other preference criteria may also be useful.

The route planning is based on current schedules of public transport systems. For example the route planning is based on current schedules of different public transport systems within an area of interest. The area of interest can encompass any area of interest. For example, the area of interest may encompass a metropolitan area, such as a city. The area of interest may be larger, such as across cities, states, or even countries. Other types of areas of interests may also be useful. The public transport systems may include different transportation systems of a transportation network. For example, the public transport systems may be buses, trains, and/or subways of different transportation systems.

Figure 1A:
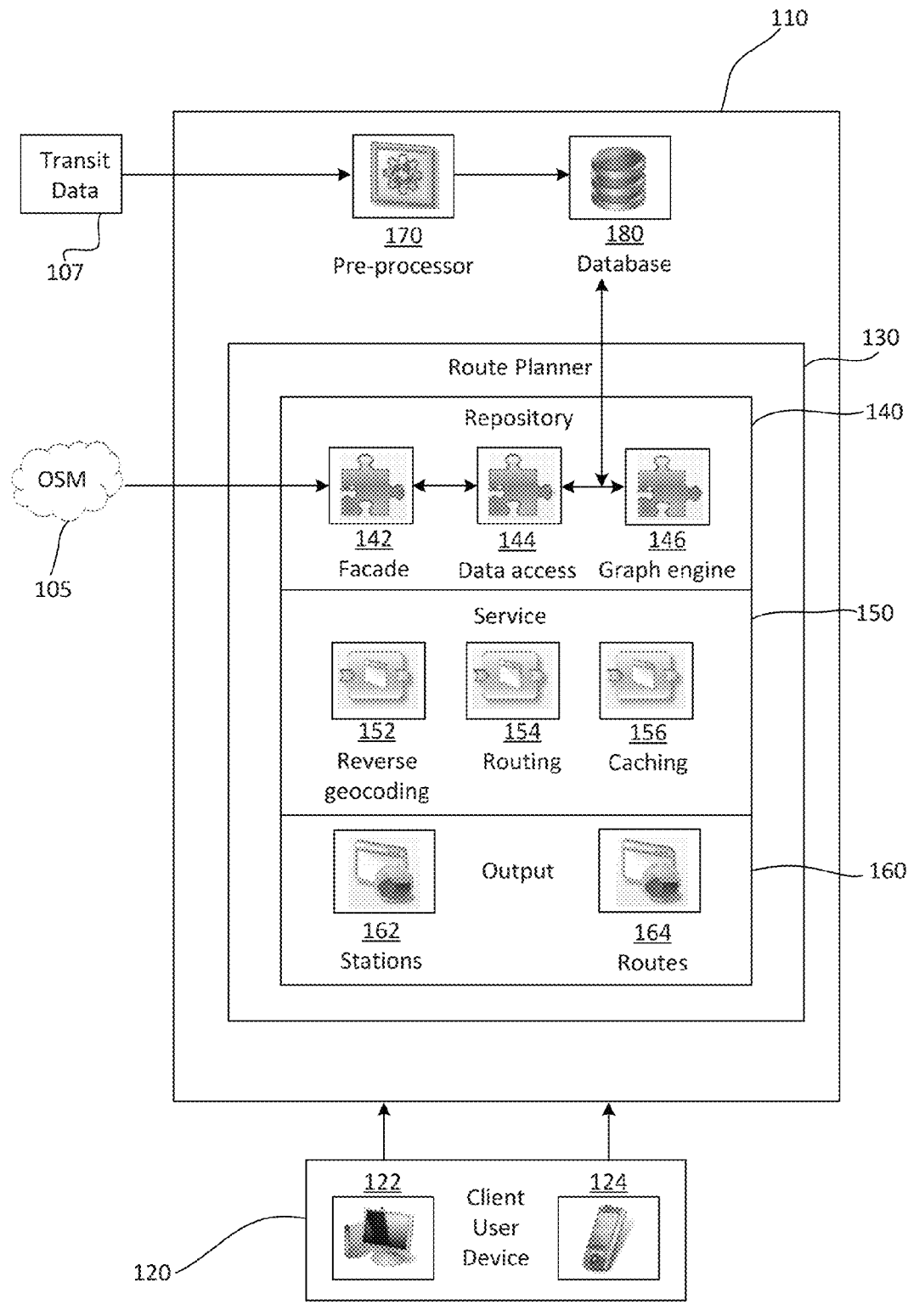
FIG. 1a shows a simplified diagram of an exemplary route planning framework.

FIG. 1 shows a simplified block diagram of an exemplary embodiment of a route planning system 100. The route planning system 100, for example, may have a distributed architecture, such as a client-server architecture. In a distributed architecture, a server 105 is accessible by client or user devices 120. Other types of architectures may also be useful.

In the distributed architecture, the server may include one or more computers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component.

In case the server includes more than one computer, they are connected through a communication network such as an internet, intranet, local area network (LAN), wide area network (WAN) or a combination thereof. The servers, for example, are part of the same private network. The servers may be located in single or multiple locations. Other configurations of servers may also be useful.

As for client or user devices, they may be any computing devices. A computing device, for example, includes a local memory and a processor. The computing device may further include a display. The display may serve as an input and output component of the user device. In some cases, a keyboard or pad may be included to serve as an input device. The memory may be volatile or non-volatile types of non-transitory computer-readable media such as magnetic media, optical media, RAM, ROM, removable media, or any other suitable memory component. Various types of processing devices may serve as user devices. For example, the user devices may include a personal computer 122 or a smart phone 124. Other types of user devices, such as laptops or tablet personal computers (PCs) may also be useful.

The user devices may communicate with the server through a communication network, such as the internet, intranet, LAN, WAN or a combination thereof. Other type of networks may also be useful. In some cases, the network may be a cloud. A user may connect to the server using a user device. The user device may be referred to as the client side while the server may be referred to as the server side.

As shown, the route planning system includes a route planner 130. The route planner, for example, resides in the server. The route planner, in one embodiment, includes a repository module 140, a service module 150 and an output module 160. In one embodiment, the route planner may be implemented as a Spring Boot Application. Implementing the route planner using other types of applications may also be useful.

The repository module, in one embodiment, includes various repository units for developing a transportation graph from data stored in a database 180. The database, for example, may be a relational database or Structured Query Language (SQL)-based database. In one embodiment, the database includes in-memory, such as SAP HANA database from SAP SE. Other types of databases may also be useful. In one embodiment, the repository module includes a façade unit 142, a data access unit 144 and a graph engine unit 146. Providing the repository module with other units may also be useful. The various repository units may be in-memory to the route planner system. For example, the repository units are internal to the route planner system or application. Other configurations of the repository units may also be useful.

The graph engine unit, in one embodiment, uploads transportation data corresponding to the transportation network. The transportation data contains information of a transportation network of a geographical area of interest. The geographical area of interest, for example, may be of any scale. For example, the area of interest may encompass a metropolitan area, such as a city and its surrounding areas. Other sized areas of interest, such as, cities, counties, states, or countries, may also be useful.

The transportation network, for example, may be include various services. For example, the transportation network may include bus services, train services, other types of transportation services or a combination thereof. The network may include numerous services or lines. The transportation data contains information, such as routing, stations/stops and schedules across different service or lines of the transportation network. For example, the transportation data may contain routing, stations/stops, and schedules of different bus service lines of the transportation network. A station may refer to a station or stop of a service line, such as a train station of a train service line, a bus stop of a bus line, a trolley stop of a trolley line.

The transportation data may take into account multiple travel calendars. For example, the transportation data may have different schedules for different calendar days. Different service schedules may be implemented for different types of days, such as work days, weekends and public holidays. Holidays may be grouped along with weekends. Other configuration of calendars may also be useful.

The graph engine analyzes the transportation data and generates a transportation graph of the transportation network. In one embodiment, the graph engine generates a time-dependent transportation graph of the transportation network. For example, a data structure representing the time-dependent transportation graph is generated. Other types of transportation graphs may also be useful. For example, a time expanded transportation graph may also be useful. The transportation graph contains transportation information, such as routing, stations, and schedules (e.g., arrival and departure times at stations) of a transportation network. Depending on the data contained in the database, the transportation graph may include different types of transportation services and/or different calendar schedules.

The data structure of the transportation graph, in one embodiment, includes an in-memory data structure. For example, the data structure is part of the route planner system or application. This improves performance of the system.

In one embodiment, the transportation graph is derived from publicly available transit data 107. The transit data may be obtained, for example, through the internet. Other techniques for obtaining the transit data may also be useful. The transit data, for example, is provided by the transportation service provider. The system includes a pre-processor 170 which processes the transit data. The transit data may be in, for example, a standard format such as the General Transit Feed Specification (GTFS[3]) format. Other types of formats may also be useful. In one embodiment, the pre-processor parses the transit data to obtain schedule and station information. The pre-processor may be tailored to the format of the transit data. The pre-processor may be a general pre-processor with different modules for pre-processing different formats of transit data. Other types of pre-processors may also be useful. The pre-processed data is stored in the database for use by the graph engine.

In one embodiment, the repository module includes the data access unit 144. The data access unit maintains the information of stations, such as station names and geolocations. Other station information, such as addresses, may also be useful. Geolocation information may be obtained from map data. The map data may be provided or obtained from a map data service. In one embodiment, the map data service may be OpenStreetMap (OSM). Other map data services may also be useful. The map data service may be accessed through the internet 105. The geolocations of the stations may be obtained by looking up the names or addresses from OSM. To interface with the map data service, the façade unit 142 is provided in the repository. For example, an OSM façade unit is provided for accessing the geocoding function in OSM. For example, the façade unit accesses the OSM to get the nearest geolocation corresponding to a nearest address or station name input by the user as a user query. The user may query the address and/or station name using a user interface (UI) of the system.

The service module includes various service units to generate route plans for a user. In one embodiment, the service module includes a reverse geocoding unit 152, a routing service unit 154 and a caching unit 156. Providing other service units may also be useful.

The routing unit is the core unit of the service module which is used to generate relevant routes based on information from the user provided in a query. The query, for example, may be provided using a UI. The information provided may include origination, destination, departure time at origination and expected arrival time at destination. The origin and destination location may be provided as text input, such as a street name, address, station name or a combination thereof. Other types of information, such as a zip code may also be useful. As for time, it may include date and time. Other types of information may also be provided by the user. The UI may include various types of command for navigating the route planner application. Some information may be obtained automatically. Such information may be based on the location and time of query of the user. For example, the user may indicate that the current time may be the departure time of the query and the origination station may be the nearest station at the current location of the user. This can be obtained from native functions of the device, such as time and global positioning system (GPS) functions.

The reverse geocoding service finds the nearest station given the geolocation of the user. For example, the reverse geocoding service issues spatial queries on the station data maintained in the database based on geocoding of the origination location. As for the caching service unit, it is employed to improve system performance. For example, frequent locations queried by the user are cached to avoid the latency of external geocoding process. Also, frequent queries from the users (including origin, destination, and departure time) are also cached for later use. This avoids re-computing the results.

The output module includes application program interface (API) units which are exposed to the client applications. For example, the API units are invoked by applications on the user device, such as native mobile applications and web applications with responsive user interfaces to provide optimal viewing experiences across a wide range of devices, such as personal computers (PCs), laptops, smart phones, tablet computers as well as other types of devices. The API units, for example, are Representational State Transfer (REST) API units. Other types of API units may also be useful. In one embodiment, the output module includes stations API unit 162 and routes API unit 164. The stations API unit gets information of stations while the routes API unit gets routes based on a query.

Figure 1B:
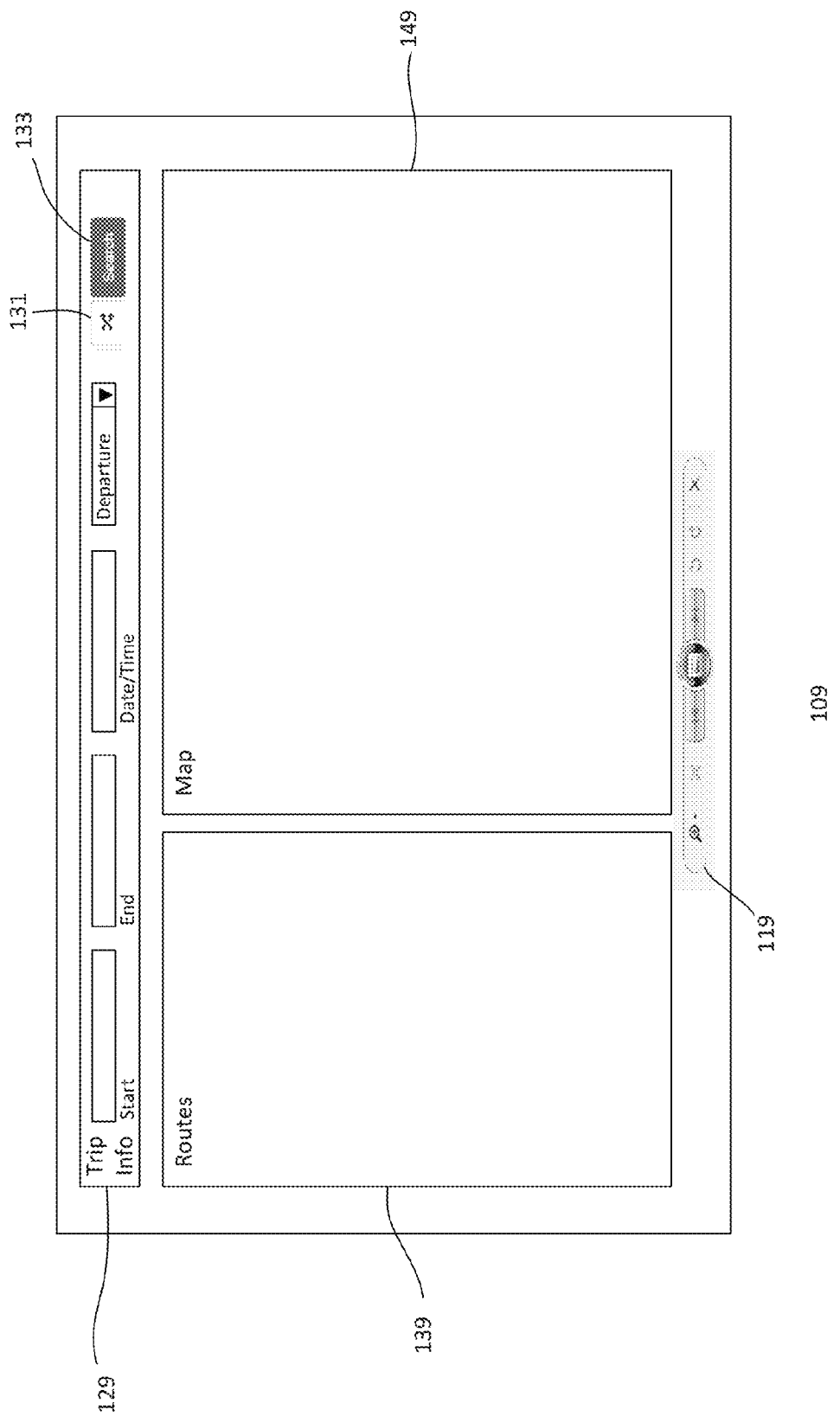
FIG. 1b shows an embodiment of a user interface (UI) of the route planning system.

FIG. 1*b* shows a simplified exemplary embodiment of a UI 109. As shown, the UI includes various panes for entering information for and displaying information of the route planning system as well as a command bar 119 for navigation purposes. In one embodiment, the UI includes a trip information panel 129, a routes suggestion panel 139 and a map panel 149. Providing the UI with other panels as well as other functions may also be useful.

The trip information panel provides various input boxes for providing the trip information. For example, a start (origination) location, an end (destination) location, date/time input box are provided. In one embodiment, the date/time box includes a time type selection box for selecting the time type. For example, the type selection box includes a drop down menu for the user to select the time type, such as departure time or arrival time. For example, a user may select the departure time of the route from the origination point to the destination point or the desired arrival time at the destination point. In one embodiment, the default departure time is the current time and the default origination is the current location when such input boxes are left blank. For example, the current time and current location are related to the time and place of the query. A search command button 133 is provided to initiate the search based on the trip information. For convenience, the UI includes a swap button 131 to swap the origination and destination locations.

As for the route suggestion panel, it provides different route suggestions for the user based on the trip information. For example, after the user clicks on the search button, the system returns the suggested routes to the user. The routes, for example, may indicate the stations, transfers, and walking components as well as the amount of time for the trip. The format that a suggested route is displayed may display the different types of components in sequence and the total time of the trip. For example, a trip may include a walking component to station A from the current location, taking service line 1 to station B, transfer to line 2 to station C with a total travel time of x minutes.

The map panel may initially display a map of the area w the user is located. This may include a pin indicating the location of the user. A user may select one of the suggested routes by clicking on it in the routes suggestion panel. This may cause the map to display the route on the map. For example, the route from the origination to the destination is displayed.

Figure 1C:
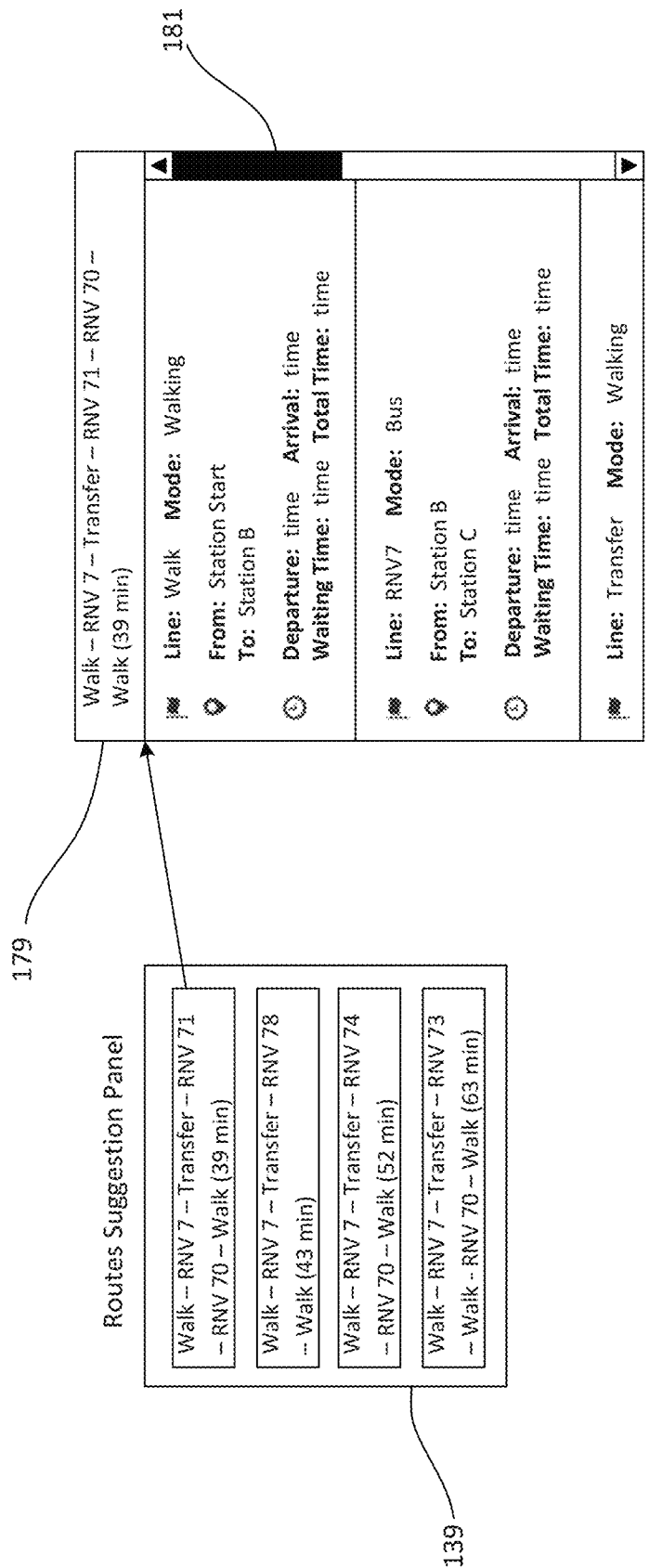
FIG. 1c shows an expanded routes suggestion panel of an embodiment of the UI of the route planning system.

FIG. 1c shows the route suggestion panel 139 of the UI in greater detail. As shown, the route suggestion panel shows suggested routes from a search based on the trip information provided by the user. The suggestion panel, for example, may return k number of routes to the user. In one embodiment, k is equal to 5. Providing other numbers for k may also be useful. The route suggestion includes walking, service and connection components as well as the total amount of time of the trip from the origination to destination. The routes may be sorted by arrival time (earliest arrival time first) and then by departure time (latest departure time first).

When a user clicks on a suggested route, the UI displays an expanded view 179 with details of the selected route. For example, the selected route is "Walk—RNV 7—Transfer—RNV 71—RNV 70—Walk (39 min)" This indicates that the user is walking to station O to take line RNV 71 to station B. At station B, the user transfers to line RNV 70 to station C. At station C, the user walks to the destination. The total travel time is 39 minutes. The expanded view displays each segment of the route. For example, the service line, mode of transportation, origination station, destination station, departure time, arrival time, waiting time and total time of each segment may be displayed. A scroll bar 181 may be provided to enable a user to scroll to view all information of the selected route.

As discussed, the graph engine generates or builds the transportation graph from public transit data, such as service schedules and station information. In one embodiment, the graph engine generates or builds a time-dependent transportation graph from public transit data such as service schedules and station information. Other types of transportation graphs, such as time expanded graphs may also be useful. Using the transportation graph, the system generates route plans based on user preference. For example, the service module generates route plans using the transportation graph of the repository module to generate route plans based on user preference.

Figure 2:
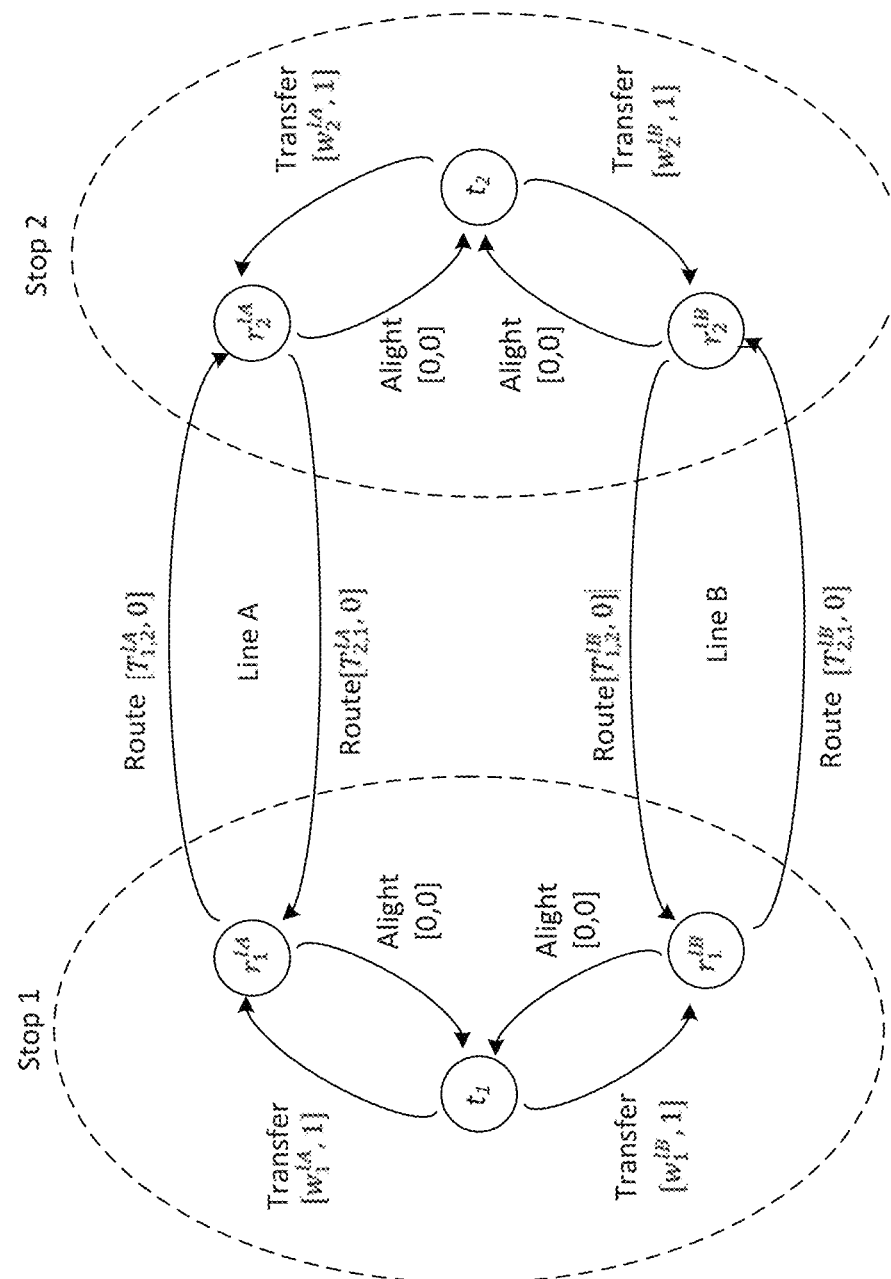
FIG. 2 shows a process for generating a time dependent transportation graph.

FIG. 2 shows a simple time dependent graph 200 generated by, for example, the graph engine. As shown, two bus lines, Line A ($l_A$) and Line B ($l_B$), is traveling between two stations, Stop 1 and Stop 2. For example, both bus lines have Stop 1 and Stop 2 as common stations. However, the bus lines may deviate beyond Stops 1 and 2. The various stations of the transportation network may be referred to as nodes. A node may be designated with a unique designation.

Since Stop 1 and Stop 2 have multiple services $l_A$ and $l_B$, they are transfer nodes $t_1$ and $t_2$. For example, a passenger may transfer from $l_A$ to $l_B$ or vice-versa at Stop 1 or Stop 2. Within a service line, Stop 1 and Stop 2 are considered route nodes $r_1$ and $r_2$. For example $r_1^{lA}$ and $r_2^{lA}$ are route nodes of line $l_A$ between Stop 1 and Stop 2 and $r_1^{lB}$ and $r_2^{lB}$ are route nodes of line $l_B$ between Stop 1 and Stop 2. In the case of a transfer node, there are route nodes for each line. For example at Stop 1, it includes a transfer node $t_1$ and route nodes $r_1^{lA}$ and $r_1^{lB}$. Likewise, Stop 2 includes transfer node $t_2$ and route nodes $r_2^{lA}$ and $r_2^{lB}$.

As an example, a user may query route plans from Stop O (origin) to Stop E (end). In the case that Stop O is served by x number of lines, at least x number of routes which may be provided. There may be more than x number of routes since intermediate stops between Stop O and Stop E may include transfer nodes which allow a passenger to transfer to another line to reach Stop O.

Nodes of the transportation graph are connected by edges. There are at least three different types of edges than can be used to connect nodes. The edges, for example, may include Transfer edges, Alight edges and Route edges. A Transfer edge may be represented by Transfer[$c_t$, $c_{tr}$], an Alight edge may be represented as Alight[$c_t$, $c_{tr}$], and a Route edge may be represented as Route[$c_t$, $c_{tr}$]. As shown, an edge includes two parameters. The parameters are cost parameters. The first parameter $c_t$ of the edge is an associated time cost while the second parameter $c_{tr}$ is a transfer cost. The cost parameters are time-dependent. For parameter $c_{tr}$, if a transfer is made, it is incremented from 0 to 1.

In the case of a Transfer edge, it connects a transfer node and a route node. The cost c, in the case of a transfer edge, is the wait time at the stop or transfer node. The time cost $c_t$ may be represented by the wait time w. For example, the Transfer edge for a transfer at Stop 1 from Line A to Line B can be represented as follows:

$$\text{Transfer}[w_1^{lA}, 1],$$

where, $w_1^{lA}$=the wait time for the connecting line at the connecting station (e.g., from $l_B$ to $l_A$ at Stop 1), and $c_{tr}=1$.

Likewise, the transfer edge at Stop 1 from Line A to Line B is Transfer[$w_1^{lB}$, 1] and transfer edges at Stop 2 can be Transfer[$w_2^{lA}$, 1] and Transfer[$w_2^{lB}$, 1].

The wait time is the amount of time that a passenger waits at the connecting station until the connecting transport arrives. The wait time may be determined by subtracting the following equation:

$$w = t_c - t_a,$$

where $t_a$=the arrival time of the current transport on which the passenger is at the connecting station, and $t_c$=the departure time of the connecting transport from the connecting station.

The arrival and departure times are maintained by the transportation graph. This information, for example, is derived from the transit data, such as the pre-processed transit data.

An Alight edge is an edge which indicates that a passenger is getting off the transport. In the Alight edge, the cost and transfer number parameters are zero. This is because there are no wait times and no transfers to a connecting train. As such, parameters $c_t$ and $c_{tr}$ are zero, as represented by Alight[0,0]. A passenger may alight and leave the station. For example, the passenger has reached his/her destination. In other cases, the passenger may alight and connect to another service. This will be represented by an Alight edge at the station and a Transfer edge connecting to the other service.

In the case of a Route edge, it is an edge which indicates that a passenger is in route between two stations, such as a previous station and a next station. For the Route edge, the cost c is the travel time T between the previous and next stations. For example, c can be T which may be calculated using the following equation:

$$T_{pn} = t_{an} - t_{dp},$$

where, $T_{pn}$=travel time between the previous station and the next station $t_{an}$=arrival time at the next station, and
$t_{dp}$=departure time at the previous station.

For example, a route edge from Stop 1 to Stop 2 for Line A may be represented by:

$$\text{Route}[T_{1-2}^{LA}, 0]$$

where, $T_{1-2}^{LA}$=the time from Stop 1 to Stop 2 on Line A, and
$c_{tr}$=0.

It is understood that the travel time between stations may not be symmetrical. Furthermore, for Route edges, $c_{tr}$ is zero.

In one embodiment, the system maps route queries to schedule for the transportation systems based on their schedule. For example, the travel schedule is based on the travel calendar. In one embodiment, the travel calendar, for example, is mapping between a real calendar day to a travel day type, such as a weekend, normal workday or public holiday. The mapping, in one embodiment, determines the schedule of a service on that travel day. In a case where multiple systems are involved, such as across different transportation systems or across regions of the geographical area of interest, multiple travel calendars may be used. For example, different transportation systems may have respective travel calendars. The time costs of different edges take into account the different travel calendars.

The travel calendars may be taken into account automatically. For example, the different travel calendars may be implemented based on a date parameter of the query and proximity of an origination station of the requester and destination stations provided by the requester at a run time. In other cases, the user may determine the date parameter of the query as well as other parameters, such as origination and destination stations. Other configurations for applying the travel calendars appropriately may also be useful.

In some embodiments, additional types of edges may be employed. In one embodiment, the system employs additionally walking edges to improve or expand available routes for a query. A walking edge connects stations or nodes of the transportation graph which are proximately located. For example, two proximately located stations may be connected by the walking edge. For example, stations which are located below a threshold distance away may be connected by the walking edge. The distance threshold $D_{TH}$ may be, for example, about 300 meters. Other distance thresholds may also be useful. The distance threshold $D_{TH}$ may be a default threshold of the system or one which is defined by the requester. For a walking edge, a passenger may alight a transport and walk to the nearby station to catch a connecting transport. In one embodiment, walking edges may be applied to stations which can serve multiple lines, but require a passenger to walk to a different platform or location to catch the connecting transport.

In the case of a walking edge, it may be represented as Walking[$c_t$, $c_{tr}$]. A walking edge may be treated similarly as a transfer edge. For example, the cost $c_t$ is the waiting cost from the current transport to the connecting transport. However, the route planner takes into account the walking time from the alighting station to the connecting station to ensure that the passenger can catch the connecting transport. Otherwise, the wait time is that for the next connecting train which the passenger can be assured to catch. To ensure that a passenger can catch the connecting train, the walking time may include an additional buffer, such as 20%. Other techniques for ensuring that a passenger catches a connecting train may also be useful.

Figure 3A:
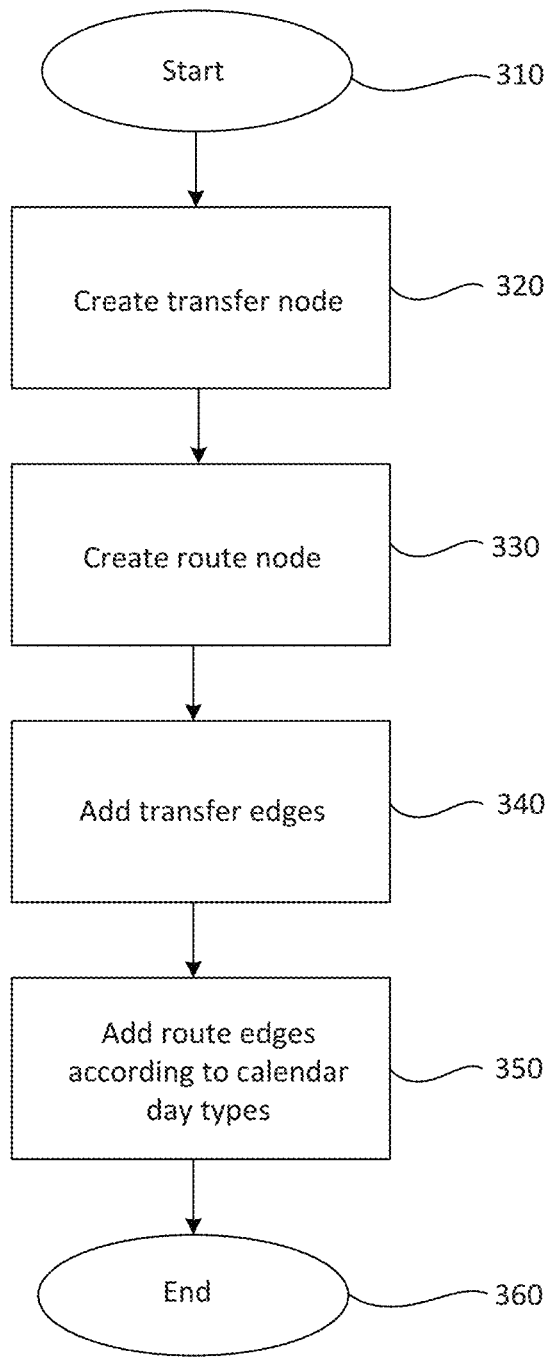
FIG. 3a shows a simple time dependent graph.

FIG. 3*a* illustrates a process 300 performed by the graph engine to build a time dependent graph. The process commences as step 310. For example, the graph engine unit retrieves pre-processed transportation data in the data base. This includes information of service lines, arrival and departure times based on calendar days or day types. For example, the calendar day may be specific days or types of days, such as weekdays, weekends and holidays. Other types of calendar days may also be useful.

At step 320, the process creates a transfer node for each station of the transportation network. For example, all stations of the transportation network are represented as transfer nodes. All stations may be designated as transfer nodes, whether a station is a shared station with different service lines or unique to a service line. For example, if the network has Z number of stations, the process creates transfer nodes $t_1$ to $t_Z$. At step 330, the graph engine unit creates a route node for every stop that a service line travels. For example, if Line A has Y number of stops from the beginning to the end of its route, Line A has route nodes $r_1^{LA}$ to $r_Y^{LA}$. Assigning route nodes to a line is performed for every line of the transportation network. In one embodiment, the process analyzes transportation data and create route nodes one line at a time until all lines have been analyzed. Each route node is associated with a transfer node. For example, in the case of station 1 which is serviced by a bus Line A, bus Line A has a route node $r_1^{LA}$ associated with transfer node $t_1$ of station 1.

The process continues to add edges connecting nodes. In one embodiment, at step 340, the process add edges between each route node and its corresponding transfer node of the transportation network. An edge from a route node to a corresponding transfer node is an alight edge while an edge from a transfer node to a corresponding route node is a transfer edge. Edges, as discussed, includes time cost $c_t$ and transfer cost $c_{tr}$ parameters. Adding edges between route nodes and corresponding transfer nodes may be achieved one transfer node at a time, one line at a time until all lines have alighted and transfer edges added. For example, edges between route nodes and corresponding transfer nodes may be added for a line, one station at a time, and then continue with adding edges for the next line until all the lines have edges added to them.

In one embodiment, walking edges are also added at step 340. Walking edges are similar to transfer edges, except that it takes into account walking time and distance between the connecting stations. The walking edges may be added for stations which are proximately located. For example, the walking edges may be added between stations which are located less than a threshold distance apart.

At step 350, route edges are added to adjacent nodes of a service line. In one embodiment, route edges are added to adjacent nodes of a service line in both directions. For example, the route edges are added from station 1 to station 2 of Line A and station 2 to station 1 of Line A. The route edges may be added for each adjacent pair in both directions, one station pair at a time, one service line at a time. The time cost parameter of a transfer edge is the travel time between the adjacent stations. The route edges, in one embodiment, are based on calendar day types. For example, the edge information includes calendar type information. Once all the route edges are added for all the route nodes, the transportation graph is completed. The process terminates at step 360.

FIGS. 3*b*-3*d* show various stages of data used to generate transportation graph, as illustrated in FIG. 2. As shown in FIG. 2, two bus lines—bus Lines A and B—service two stops—Stops 1 and 2.

Referring to FIG. 3b, bus schedules and stop information obtained from the public transit data is shown. Data table 312 shows a portion of a schedule for bus Line A. As shown, bus Line A departs Stop 1 at 9:05 am and departs Stop 2 at 9:20 am during weekdays (Mon-Fri). During the weekends (Sat-Sun), bus Line A departs Stop 1 at 9:10 am and departs Stop 2 at 9:25 am. Data table 314 shows a portion of a schedule for bus Line B in a similar manner as bus Line A. Also, a data table 316 is provided which includes stop information of Stops A and B, including their geolocations represented by longitude and latitude. If the geolocations are not available from the public transport data, they can be obtained using a geolocation service unit.

FIG. 3c shows data tables of processed data stored in the database. As shown, edge data table 322 shows edge information of the transportation graph. For example, the public transport data is processed to obtain edge information. As shown, different types of edges, such as route edges, transfer edges and alight edges are shown. The edges include travel time according to calendar type days, such as weekdays and weekends. A stop information data table 324 is also included in the database. The stop information data table is similar to data table 316 in FIG. 3b.

FIG. 3d shows in-memory data structures of the route planner system. The in-memory data structure includes a data structure 332 of the transportation graph. The data structure, for example, is a list of adjacent edges. The data structure also includes a look up table 334 of stops.

The routing service unit generates route plans for the user using the transportation graph. In one embodiment, the routing service unit generates route plans for the user using the time-dependent transportation graph based on user information and/or preferences. The route plans may be referred to as relevant alternative routes. For example, the routing service unit generates k number of alternate routes for the user to select. The k alternate routes are based on user information and/or preferences.

The routing service unit generates k number of alternate routes based on a shortest path technique. In one embodiment, the routing service unit generates alternate routes based on a diversified k shortest paths. The diversified k shortest paths, for example, employs a Dijkstra technique. The Dijkstra technique finds the shortest path between two nodes of a graph. In one embodiment, the Dijkstra technique finds the shortest path between nodes of a graph based on travel time. The Dijkstra technique is described in, for example, E. W. Dijkstra, "*A Note on Two Problems in Connexion with Graphs*", Numerische Mathematik 1, 269-271 (1959), which is herein incorporated by reference.

Figure 4:
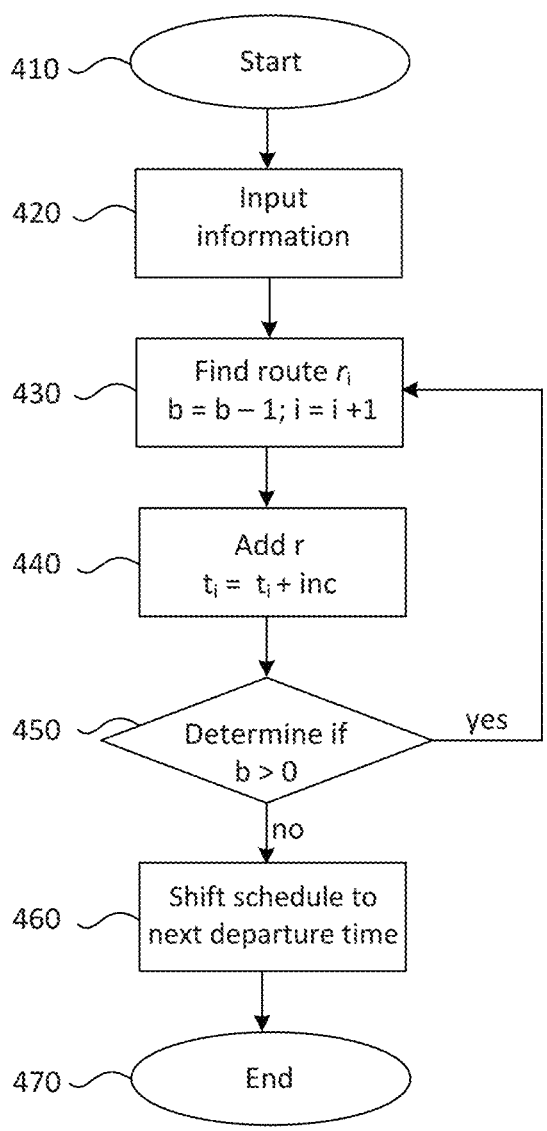
FIG. 4 shows a process for generating alternate routes using a relaxed multi-criteria (RMC) technique.

FIG. 4 shows an embodiment of a process 400 for generating diversified k shortest paths by, for example, the routing service unit. In one embodiment, the process employs the Dijkstra technique. At step 410, the process commences to generate a suggested route. For example, the process is initiated by a query requested by a user.

At step 420, various input parameters are provided to the process. The input parameters include origination node $n_s$, destination node $n_d$, departure time $t_{dep}$, number of basic candidates b, and total number of expected results k. The parameters may be provided by the user. The parameters may also be provided by a combination of the user and the system. For example, parameters b and k may be provided by the system. Parameters b and k may be system configurable parameters. These parameters may be optionally provided by the user. Parameter b is less than k. For example, k may be 5 and b may be 3. Other values of k and b may also be useful. In addition, $t_{dep}$ and $n_s$ may be provided by the system, using current time and geo-positional data of the user at time of query, or optionally by the user.

In one embodiment, an additional parameter inc may be provided. The inc parameter is the amount of time shift for subsequent basic candidate searches. Inc may be equal to 1 second. Other time increments may also be useful. For example, inc may be 30 to 60 seconds or other values. The inc parameter may be a system configurable parameter or one provided by the user. Incrementing $t^i$ by inc enables a new base route to be found.

The process may also perform initialization. For example, various counters or registers may be initialized to their initial values. For example, an integer counter i is initialized to 0, a time register $t_i$ is initialized to $t_{dep}$ ($t_i = t_{dep}$) and a b counter is initialized to b. The time in $t_i$ counter may include date and time. For example, b is equal to 3.

At step 430, the process fines a basic route from the transportation graph using the Dijkstra technique. In one embodiment, a basic route is determined based on the time and date in the $t_i$ register. The Dijkstra technique finds the shortest path, according to time and date in the $t_i$ register, from $n_s$ to $n_d$ in the graph. This takes into account schedule based on day and day type. For example, the time of the route is determined by adding the time cost $c_t$ of all edges in the route.

At step 440, the shortest path determined by Dijkstra is added to a basic candidates list. The $t_i$ register is incremented by inc and b is decremented by 1. The process, at step 450 determines if b is greater than 0. For example, if b is greater than 0, this indicates that there are more basic routes to be determined. As such, the process returns to step 430. Otherwise, all base routes have been found. In such a case, the process continues to step 460.

At step 460, the process continues to analyze the base routes. The base routes may be analyzed by shifting the schedule to the next departure time of a transport. The shifted and non-shifted base routes are analyzed. The system selects k routes for the analysis with the shortest time as k suggested routes. A counter may be used to determine if the k routes have been reached. If the k routes have been found, the process terminates.

After the k routes are determined, the process terminates at step 470. The k routes, for example, are provided as suggested routes to the user. For example, the output module provides the suggested routes to the user.

An example of a pseudo code for the a diversified k shortest path routine is provided below:

| | Diversified k shortest path routine |
|---|---|
| | Input: graph g |
| | origin node $n_s$ |
| | destination node $n_d$ |
| | departure time $t_{dep}$ |
| | number of basic candidates b |
| | total number of expected results k |
| | Output: k diversified shortest paths |
| | /* Initial query time is departure time */ |
| 1 | time $t_i = t_{dep}$ |
| 2 | int i = 0 |
| 3 | while i < b do |
| | /* run Dijkstra based on travel time */ |
| 4 | route $r_i$ = Dijkstra(g, $n_s$, $n_d$, $t_i$) |
| 5 | BaseRoutes.add($r_i$) |
| 6 | i = i + 1 |
| 7 | $t_i = r_i$(getFirstBoardingTime( ) + 1 |
| 8 | end |
| 9 | results = shift schedule of BaseRoutes to get k routes. |

As shown, the routine receives various input parameters, such as graph g, origin node $n_s$, destination node $n_d$, departure time $t_{dep}$, number of basic candidates b, and total number of expected results k. The routine generates k diversified shortest paths as an output. The value b is less than the value k. For example, b may be 3 while k is 5. Other values for b and k may also be useful. The higher the values, the longer the processing time. The routine performs initialization at lines 1 and 2. For example, the time counter is set to equal $t_{dep}$ and the int counter i is set to 0.

There are two parts to the routine. The first part retrieves b number of base routes $r_i$ while the second part obtains k routes from the base routes. In the first part, a Dijkstra subroutine is called and executes b number of times to return b number of base routes $r_i$. For example, as shown in line 3, a loop is performed as long as i is <b. At line 4, the Dijkstra subroutine is called, using g, $n_s$, $n_d$ and $t_i$ as input parameters to find an optimal route $r_i$ from $n_s$ and $n_d$ in graph g based on shortest time having departure time $t_i$. The route $r_i$ returned by Dijkstra subroutine is added to a list BaseRoutes.add($r_i$) at line 5. Line 6 and line 7 increments i and $t_i$ by 1. As shown, the time $t_i$ is incremented by 1 second. In some embodiments, it can be replaced by a user or system defined value inc, which can be other than 1 second. If i is ≥b, the loop ends at line 8.

After the b number of base routes are determined, the routine performs the second part to obtain k number of routes. At line 9, the routine shifts the schedule of BaseRoutes to get k routes. A loop may be employed to find the k routes. The loop may terminate once the k routes have been found.

In another embodiment, the k number of alternate routes are based a relaxed multi-criteria shortest path (RMC) technique. In the RMC technique, a relaxed dominance in the cost is employed. A cost may have d dimensions. In the present case, the cost of a route has two dimensions (e.g., d=2). The dimensions include total travel time ($c_t$) and the number of transfers ($c_{tr}$). The summation cost c of two costs $c_1$ and $c_2$ is equal to $c_1+c_2$, which can be defined by equation 1 below:

$$c[i]=c_1[i]+c_2[i] \forall i \in [1,d] \quad \text{(Equation 1)}.$$

Hence, the total cost of a route can be computed as the summation of the costs of the edges included in that route.

The relaxed dominance is an a dominance, which is ($\alpha \in (0, 1]$). For example, $\alpha$ has a value between 0 and 1. The smaller that $\alpha$ is, the more relax is the constraint on time. For example, a lower value for $\alpha$ decreases the dominance of time cost parameter $c_t$ while conversely, a higher value for $\alpha$ (closer to 1) increases the dominance of the time cost factor $c_t$. In other words, more consideration may be given to parameter $c_{tr}$. The $\alpha$ dominance for comparison between two costs $c_1$ and $c_2$ can be defined using equation 2 as follows:

$$c_1 \ \alpha\text{-dominates} \ c_2 \ \textit{iff} \ c_1[i] \leq \alpha^* c_2[i] \forall i \in [1,d] \text{ and}$$
$$\exists m \in [1,d], \text{ so that } c_1[m] < \alpha^* c_2[m] \quad \text{(Equation 2)}$$

where, d=the number preference or cost dimensions (in this case, d=2, $c_t$ and $c_{tr}$), $c_1$=the first multi-dimensional cost, $c_2$=the second multi-dimensional cost, i=the index of cost dimension (in this case, i=1 to d which is 1 to 2), m=the index cost dimension to be relaxed (in this case, either the $c_t$ or $c_{tr}$ constraint is relaxed).

The relaxed dominance increases the probability of finding more potential routes. For example, under strict dominance ($\alpha=1$), route 1 which takes 40 minutes dominates route 2 which takes 50 minutes. However, with $\alpha$ set at 0.7 or less, route 1 no longer dominates route 2. As such, both route 1 and route 2 would be candidate routes whereas under strict dominance, only route 1 would be a candidate route.

Figure 5:
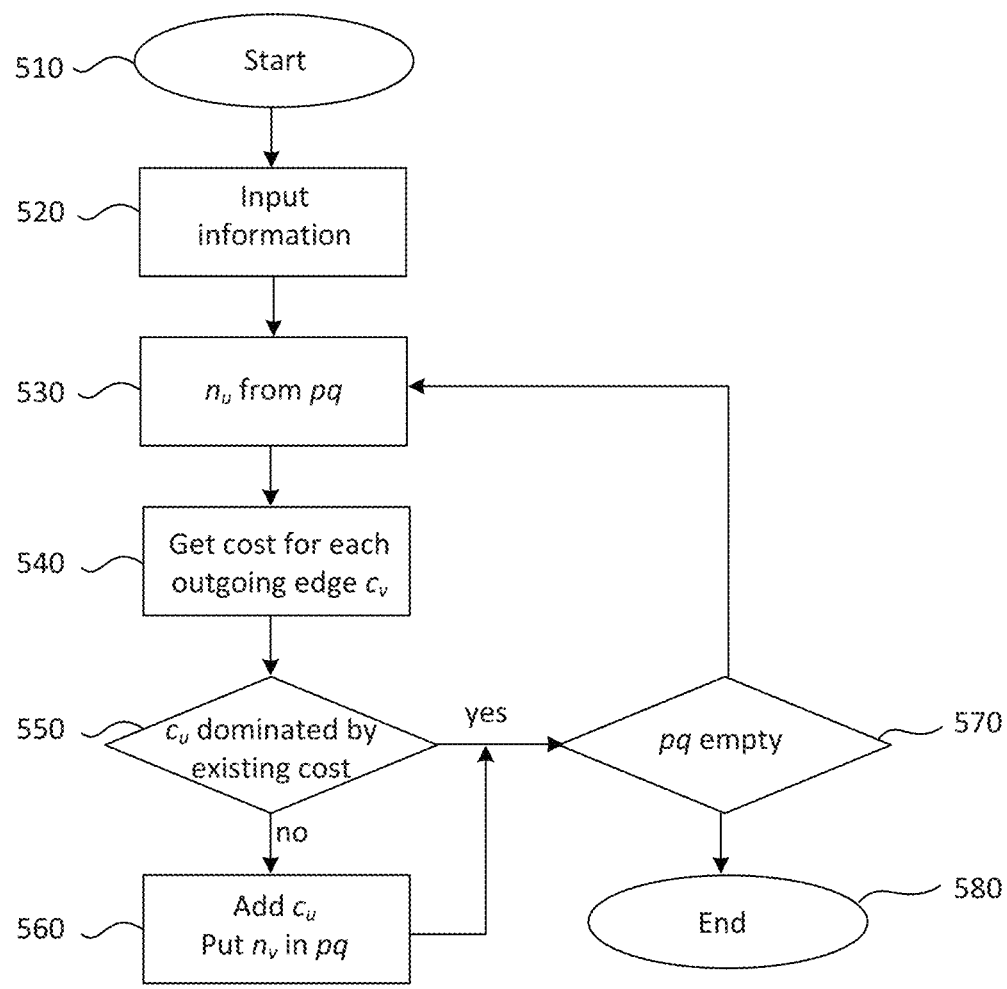
FIG. 5 shows a process for generating alternate routes using diversified k shortest paths.

FIG. 5 shows another process 500 for generating alternate routes between a source (originating) node $n_s$ and a destination node $n_d$. As discussed, the transportation graph includes nodes which are interconnected by edges. A node label $l_i$ refers to a pair structure ($n_i$, $c_i$) of node $n_i$ with associated cost $c_i$. The cost $c_i$ is a multi-dimensional cost which, in one embodiment, include time cost $c_t$ and transfer cost $c_{tr}$.

The process, when invoked, initializes at step 510 the various storage components for generating alternate routes. For example, a user submits a query to the system to invoke the system. The components include, in one embodiment, a priority queue pq component, a predecessor map pm component and a node cost list cl component which are initialized. The pq component determines which node label to analyze next. For example, pq is a stack which contains node labels to analyze next. The pm component tracks the predecessor of a current node label under analysis. The cl component contains a list of non-$\alpha$-dominated cost for nodes analyzed in the transportation graph. The cl component sorts the nodes in ascending travel time. Initialization, for example, clears the various storage components.

At step 520, input information is provided. For example, input information includes $n_s$, $n_d$, $\alpha$, k and $t_{dep}$. The information may be provided by the user. The parameters may also be provided by a combination of the user and the system. For example, parameters $\alpha$ and k may be provided by the system. Parameters $\alpha$ and k may be system configurable parameters. These parameters may be optionally provided by the user. Parameter k, for example, may be 5. Other values of k may also be useful. As for $\alpha$, it may be an appropriate value. For example, $\alpha$ may be about 0.7 to 0.9. Other values of $\alpha$ may also be useful. However, if $\alpha$ is too small, the run time may take too long since there may be too many options to consider. In addition, $t_{dep}$ and $n_s$ may be provided by the system, using current time and geo-positional data of the user at time of query, or optionally by the user.

In one embodiment, label $l_s$ is loaded in the priority queue pq. For example, at this stage, pq contains only $l_s$, which is a pair structure ($n_s$, $c_s$) of node $n_s$ with associated cost $c_s$. The label at top of the stack of pq is referred to as $l_u$. For example, the subscript u refers to the next label or node to analyze.

At step 530, the process pops $l_u$ from pq to analyze. As discussed, $l_u$ includes node $n_u$ and cost $c_u$. At step 540, the process obtains cost $c_v$ for each outgoing edge from $n_u$. The subscript v refers to a next edge to node $n_v$ to compare with cost $c_u$ of node $n_u$. For example, if there are 3 outgoing edges, each one will be analyzed. This may be achieved by loading each outgoing edge's $l_v$ into pq. For example, if $n_u$ has 3 outgoing edges to $n_{v1}$, $n_{v2}$ and $n_{v3}$, each outgoing edge is analyzed. Each outgoing edge is analyzed one at a time. For example, $n_{v1}$ is analyzed first, then $n_{v2}$ and then $n_{v3}$.

At step 550, each cost $c_v$ of an outgoing edge is analyzed with $c_u$ to determine if $c_v$ is dominated by $c_u$. The dominance analysis, for example, is $\alpha$ dominance as described by equation 2. If $c_v$ is dominated by $c_u$, $l_v$ is loaded into pq at step 560. All $c_v$s which are dominated by $c_u$ are added to pq. The process continues to step 570. If no $c_u$ dominates all $c_v$s, the process continues to step 570.

At step 570, the process determines if pq is empty. If pq is not empty, the process returns to step 530. If pq is empty, this indicates that node $n_d$ has been reached by the analysis and the process terminates at step 580. The routes which survives the analysis are potential routes. If the potential routes exceed k, the top k routes based on lowest cost are provided as suggested routes. For example, a counter may be used to determine of k number of routes have been found. The output module may provide the suggested routes to the user.

An example of a pseudo code for a relaxed multi-criteria k shortest paths is provided below:

```
                Relaxed multi-criteria k shortest paths
       Input:     graph g
                  origin node n_s
                  destination node n_d
                  departure time t_dep
                  dominance level α
                  max number of candidates k
       Output: shortest paths and expected costs
                  /* initialization                           */
  1    priorityQueue pq = Ø
  2    predessorMap pm = Ø
  3    nodeCostList cl = Ø
  4    label l_s = createLabel(n_s, c_s = 0)
  5    pq.insert(l_s)
  6    while !pq is not empty
  7        label l_u = pq.pop( )
  8        Node n = l_u.getNode( )
  9        for each outgoing edge e_u,v do
 10            c_v = c_u + e_u,v.getCost(t + c_u.time)
 11            List<cost> costs = cl.getCosts(n_v)
 12            if c_v is α-dominated by costs then
 13                continue
 14            end
                  /* c_v is not dominated                      */
 15            costs.put(c_v)
 16            costs.removeDominated( )
 17              label l_v = createLabel(n_v, c_v)
 18              pm.put(l_v, l_u)
 19              pq.insert(l_v)
 20        end
 21    end
```

As shown, the routine receives various input parameters, such as graph g, origin node $n_s$, destination node $n_d$, departure time $t_{dep}$, α and k. The routine generates relaxed multi-criteria k diversified shortest paths as an output. The routine performs initialization at lines 1-5. For example, the pq, pm and cl are set to Ø while $l_s$ is set with $n_s$ and c. In addition, $l_s$ is loaded into pq.

The routine, at line 6, performs an outer loop as long as pq is not empty. The loop includes popping $l_u$ off pq and getting the node of $l_u$, which is $n_u$. This is shown in lines 7-8. A second loop is performed within the outer loop, as shown in line 9. The second loop is performed for each outgoing edge of $n_u$. For each outgoing edge, cost $c_v$ is obtained. If $c_v$ is not dominated, it is inserted into pq. If pq is empty, the routine terminates. As discussed, the routine finds k routes to suggest. A counter may be use to terminate the routine if the k routes have been found.

In another embodiment, the route planner may include an option for the user to select between a diversified k shortest path routine or a relaxed multi-criteria k shortest path routine. For example, the UI may include an option for the user to select between the two options.

Figure 6:
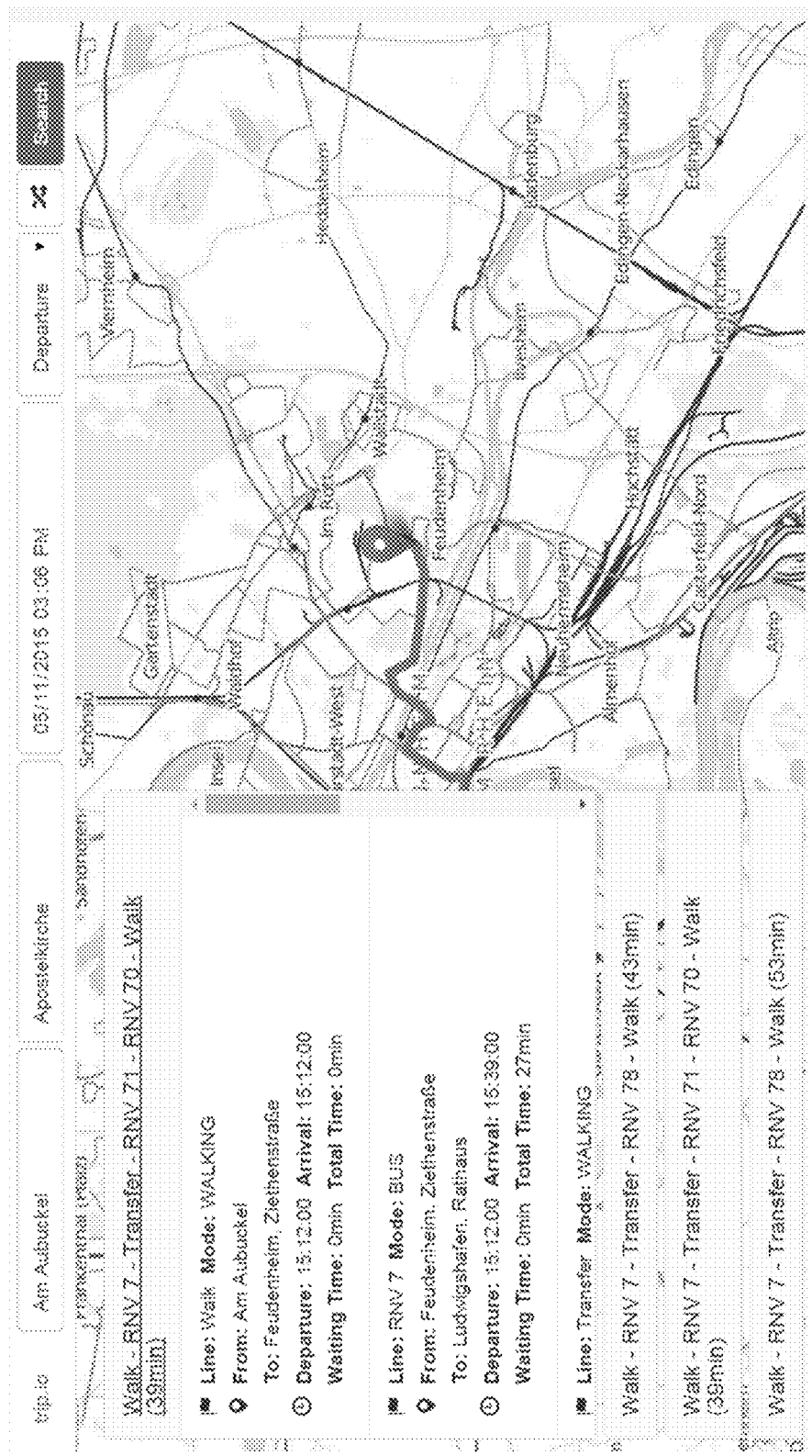
FIG. 6 shows a screen short of experimental results using the diversified k shortest paths technique.

An experiment was conducted using the route planner system using the diversified k shortest paths technique. FIG. 6 provides a screenshot 600 of the returned routes which are sorted by arrival time (earliest arrival comes first) and then by departure time (latest departure time comes first). As shown, the route planner system can provide users with options to take the next best route if they miss the first optimal one. More importantly, these options also include other preferences, e.g., less number of transfers as long as the routes are reasonable in terms of total travel time.

As described, the various modules of the evaluation system may be embodied as an application. For example, the various modules may be embodied as a software application. The modules may be integrated into a client/server or stand-alone software application. The source code or codes of the application may be compiled to create an executable code. The codes, for example, may be stored in a storage medium such as one or more storage disks. Other types of storage mediums may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method performed by a computer system for recommending public transportation routes of a transportation network to a user comprising:
   providing a transportation graph comprising a plurality of station nodes corresponding to stations of the transportation network, wherein each station node comprises
      x unique route nodes corresponding to x number of unique transportation services servicing the station of the station node, wherein each of the x unique route nodes comprises
   a first outgoing edge, the first outgoing edge is connected to a next station node of the route of the transportation service,
   a first incoming edge, the first incoming edge is connected to a previous station node of the route of the transportation service,
   a second outgoing edge, the second outgoing edge is connected to the previous station node of the route of the transportation service,
   a second incoming edge, the second incoming edge is connected to the next station node of the route of the transportation service, and wherein
      the incoming and outgoing edges are route edges,
      the first incoming and outgoing edges correspond to a first direction of the route of the transportation service,
      the second incoming and outgoing edges correspond to a second direction of the route of the transportation service, and
      the edges include cost information and transport schedules;
   receiving input parameters from a user query on a user device, wherein the input parameters include an origination node $n_s$ a destination node $n_d$ and a departure time $t_{dep}$;
   generating k number of routes to suggest to the user based on the input parameters using k shortest paths; and
   displaying the k number of routes on a display of the user device of the user.

2. The computer-implemented method of claim 1 wherein providing the transportation graph comprises generating the transportation graph based on public transport data.

3. The computer-implemented method of claim 2 wherein generating the transportation graph comprises pre-processing the public transport data to obtain schedule and station information.

4. The computer-implemented method of claim 2 wherein generating the transportation graph comprises pre-processing the public transport data to obtain schedule and station information based on calendar day type.

5. The computer-implemented method of claim 1 wherein each of the station nodes of the transportation graph comprises:
a transfer node:
x incoming edges to the transfer node, each of the x incoming edges is coupled to one of the x route nodes of the station node, the incoming edges are alight edges; and
x outgoing edges from the transfer node, each of the x outgoing edges are coupled to one of the x route nodes of the station node, the outgoing edges are transfer edges.

6. The computer-implemented method of claim 5 further comprises walking edges between two proximately located stations of two different transport service lines, wherein the two stations are located below a threshold distance, wherein the walking edges are transfer edges not located at the same station.

7. The computer-implemented method of claim 6 wherein:
the edges include a two-dimensional cost, the first dimension is a time cost ct and the second dimension is a transfer cost $c_{tr}$;
for transfer edges, $c_t$=wait time of connecting transport and $c_{tr}$=1;
for walking edges, $c_t$=wait time of connecting transport taking into account transfer time and $c_{tr}$=1; and
for route edges, $c_t$=travel time and $c_{tr}$=0.

8. The computer-implemented method of claim 7 wherein generating the k number of routes to suggest to the user based on the input parameters comprises diversified k shortest paths.

9. The computer-implemented method of claim 8 wherein the diversified k shortest paths comprise:
finding b number of base routes, wherein finding the b number of base routes comprises
performing an initialization which includes
setting b=b, wherein b<k,
setting i=0, wherein i denotes an initialization counter, and
setting time $t_i$=departure time $t_{dep}$, and
finding base route $r_i$, according from $n_s$ to $n_d$ based on $t_{dep}$ and calendar day type,
b=b−1,
i=i+1, and
add base route $r_i$, to base route list wherein
if b>0, then repeat steps from finding base route $r_i$, and
if b is not greater then 0, then end finding b number of base routes; and
shifting the b number of the base routes in the base route list to find the k number of routes.

10. The computer-implemented method of claim 9 wherein b and k are defined parameters of the computer-implemented method.

11. The computer-implemented method of claim 7 wherein generating the k number of routes to suggest to the user based on the input parameters comprises relaxed multi-criteria (RMC) k shortest paths.

12. The computer-implemented method of claim 11 wherein the RMC k shortest paths comprise:
performing the initialization which includes
setting priority queue pq to null, pq comprises a stack of node labels, and
setting $l_s$ to equal to $(n_s, c_s)$, $l_s$ is an origination node label comprising the origination node $n_s$ and cost $c_s$,
load $I_s$ into pq, wherein a top node label of the stack of pq is referred to $I_u$
which is equal to $(n_u, c_u)$; and
performing a cost analysis comprising
pop $I_u$ from $p_q$,
and analyzing $n_u$ comprising
obtaining a cost for each outgoing edge $c_v$ from $n_u$,
if the cost of $c_v$ is not dominated by $c_i$, then add $1_v$, which is equal to $(n_v, c_v)$, to pq, and go to checkpq, wherein $I_v$ denotes a neighboring node label, $n_v$ denotes a neighboring node of $I_v$ connected by the outgoing edge from $n_u$, and
if the cost of $c_v$ is dominated by $c_u$, then go to check pq, and at check pq, checking pq to determine if pq is empty,
if pq is not empty return to analyzing $n_u$, and
if pq is empty, then terminate and return the k number of routes as suggested routes.

13. The computer-implemented method of claim 12 wherein determining if $c_v$ is dominated by $c_u$ comprises α dominance.

14. The computer-implemented method of claim 13 wherein k and α are defined parameters of the computer-implemented method.

15. The computer-implemented method of claim 7 wherein generating the k routes to suggest to the user based on the input parameters comprises:
diversified k shortest paths;
RMC k shortest paths; and
wherein the user selects one of the diversified k shortest paths and the RMC k shortest paths to generate the k number of routes.

16. A route planning system for generating suggested routes of a transportation network comprising:
a route planning server on the server side;
a user device of a user on the client side, the user device is communicatively coupled to the route planning server by a communication network, the user device includes a non-transitory computer readable storage medium containing a client route planning application; and
wherein the transportation server comprises
a processor and a non-transitory computer readable storage medium,
a repository module, wherein the repository module comprises a graph engine unit, the graph engine includes a data structure representing a transportation graph, the transportation graph comprising a plurality of station nodes corresponding to stations of the transportation network, wherein each station node comprises
x unique route nodes corresponding to x number of unique transportation services servicing the station of the station node, wherein each of the x unique route nodes comprises
a first outgoing edge, the first outgoing edge is connected to a next station node of the route of the transportation service,
a first incoming edge, the first incoming edge is connected to a previous station node of the route of the transportation service, a second outgoing edge, the second outgoing edge is connected to the previous station node of the route of the transportation service, a second incoming edge, the second incoming edge is connected to the next station node of the route of the transportation service, and wherein the incoming and outgoing edges are route edges, the first incoming and outgoing edges correspond to a first direction of the route of the transportation service, and the second incoming and outgoing edges correspond to a second direction of the route of the transportation service, and the edges include cost information and transport schedules, a service module, wherein the service module comprises a routing service unit for generating routes to a user based on a user query received from the user device, the user query includes an origination node $n_s$, a destination node $n_d$ and a departure time $t_{dep}$, wherein the routing service unit generates the routes using k shortest paths, and an output module, the output module comprises application program interface units which are exposed to the client route planning application for displaying the routes on the user device.

17. The route planning system of claim 16 wherein the routing service unit generates-routes using diversified k shortest paths.

18. The route planning system of claim 16 wherein the routing service unit generates routes using relaxed multi-criteria (RMC) k shortest paths.

19. A computer-implemented method performed by a computer system planning routes for a transportation network comprising:

providing an in-memory time dependent transportation graph comprising stations of the transportation network, wherein each station of the transportation graph is designated with a plurality of nodes, each of the nodes is designated with a unique transportation service servicing the station, the nodes are connected by edges, wherein the edges include cost information and transport schedule;

receiving input parameters from a user query on a user device, wherein the input parameters include an origination node $n_s$, a destination node $n_d$ and a departure time $t_{dep}$; and generating k number of routes to suggest to the user based on the input parameters using k shortest paths; and displaying the k number of routes on a display of the user device of the user, wherein generating the k routes includes diversified k shortest paths comprising:

finding b number of base routes, wherein finding the b number of base routes comprises performing an initialization which includes setting b=b, wherein b<k, setting i=0, wherein i is initialization counter, and setting time $t_i$=departure time $t_{dep}$, and finding base route $r_i$ according from $n_s$ to $n_d$ based on $t_{dep}$ and calendar day type, b=b−1, i=i+1, and add base route $r_i$, to base route list wherein if b>0, then repeat steps from finding base route $r_i$, and if b is not greater then 0, then end finding b number of base routes; and shifting the b number of base routes in base route list to find k number of routes.

\* \* \* \* \*